United States Patent
Kim (10) Patent No.: US 10,390,669 B2
(45) Date of Patent: Aug. 27, 2019

(54) ROBOT CLEANER AND WHEEL ASSEMBLY

(71) Applicant: LG ELECTRONICS INC., Seoul (KR)

(72) Inventor: Hwang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 192 days.

(21) Appl. No.: 15/440,662

(22) Filed: Feb. 23, 2017

(65) Prior Publication Data

US 2017/0245710 A1    Aug. 31, 2017

(30) Foreign Application Priority Data

Feb. 26, 2016  (KR) .................. 10-2016-0023400

(51) Int. Cl.
*A47L 9/00* (2006.01)
*A47L 9/28* (2006.01)
*B60B 33/00* (2006.01)

(52) U.S. Cl.
CPC ............ *A47L 9/009* (2013.01); *A47L 9/2868* (2013.01); *B60B 33/00* (2013.01); *A47L 2201/00* (2013.01); *A47L 2201/04* (2013.01)

(58) Field of Classification Search
CPC .. A47L 2201/00; A47L 2201/04; A47L 9/009; A47L 9/2868; B60B 33/00
See application file for complete search history.

(56) References Cited

U.S. PATENT DOCUMENTS

| | | | | |
|---|---|---|---|---|
| 5,343,916 A * | 9/1994 | Duddey | ............... | B60C 7/12 152/326 |
| 6,615,885 B1 * | 9/2003 | Ohm | ............... | B60B 9/26 152/11 |
| 6,681,822 B2 * | 1/2004 | Adams | ............... | B60B 9/00 152/326 |
| 7,174,936 B2 * | 2/2007 | Becker | ............... | B60C 7/10 152/246 |
| 8,056,593 B2 * | 11/2011 | Palinkas | ............... | B29D 30/02 152/323 |
| 8,176,957 B2 * | 5/2012 | Manesh | ............... | B60C 7/12 152/301 |
| 8,276,628 B2 * | 10/2012 | Hanada | ............... | B60C 7/12 152/11 |

(Continued)

FOREIGN PATENT DOCUMENTS

| JP | 05-077605 | 3/1993 |
|---|---|---|
| JP | H 0577605 | 3/1993 |

(Continued)

OTHER PUBLICATIONS

Korean Office Action dated Nov. 16, 2016 issued in Application No. 10-2016-0023400.

(Continued)

*Primary Examiner* — Marc Carlson
(74) *Attorney, Agent, or Firm* — KED & Associates LLP (57) ABSTRACT

A robot cleaner includes: a body having a suction port; a plurality of wheels for movement of the body; and a plurality of driving devices configured to drive the plurality of wheels, respectively, wherein each of the plurality of wheels includes an inner wheel and an outer wheel having a thickness that is larger than a thickness of the inner wheel, and each of the inner wheel and the outer wheel includes a plurality of slits.

21 Claims, 10 Drawing Sheets

(56) References Cited

U.S. PATENT DOCUMENTS

| | | | |
|---|---|---|---|
| 8,944,125 B2* | 2/2015 | Manesh | B60C 7/12 |
| | | | 152/326 |
| 8,962,120 B2* | 2/2015 | Delfino | B60B 9/02 |
| | | | 152/43 |
| 9,108,470 B2* | 8/2015 | Tercha | B60C 7/08 |
| 9,266,388 B2* | 2/2016 | Schaedler | B60B 9/26 |
| 9,321,312 B2* | 4/2016 | Asper | B29D 30/02 |
| D767,483 S * | 9/2016 | Martin | D12/579 |
| 9,511,631 B2* | 12/2016 | Fudemoto | B60C 7/14 |
| 9,511,632 B2* | 12/2016 | Fudemoto | B60C 7/14 |
| D777,655 S * | 1/2017 | Martin | D12/605 |
| 9,573,422 B2* | 2/2017 | Gass | B60B 9/00 |
| 2008/0053586 A1* | 3/2008 | Hanada | B60C 7/08 |
| | | | 152/310 |
| 2010/0037418 A1* | 2/2010 | Hussey | A47L 5/30 |
| | | | 15/319 |
| 2010/0108215 A1* | 5/2010 | Palinkas | B60C 7/102 |
| | | | 152/324 |
| 2012/0234444 A1* | 9/2012 | Palinkas | B60C 7/18 |
| | | | 152/246 |
| 2014/0251518 A1* | 9/2014 | Abe | B60B 9/04 |
| | | | 152/75 |
| 2015/0165498 A1* | 6/2015 | Kim | B08B 13/00 |
| | | | 173/213 |
| 2015/0251492 A1* | 9/2015 | Fudemoto | B60C 7/14 |
| | | | 152/80 |
| 2015/0258853 A1* | 9/2015 | Fudemoto | B60C 7/14 |
| | | | 152/80 |
| 2015/0273935 A1* | 10/2015 | Fudemoto | B60B 9/04 |
| | | | 152/80 |
| 2015/0273936 A1* | 10/2015 | Nishida | B60B 9/04 |
| | | | 152/80 |
| 2015/0283851 A1* | 10/2015 | Abe | B60C 7/18 |
| | | | 152/80 |
| 2016/0089935 A1* | 3/2016 | Iwamura | B60C 7/18 |
| | | | 152/69 |
| 2017/0181592 A1* | 6/2017 | Park | A47L 9/009 |

FOREIGN PATENT DOCUMENTS

| | | |
|---|---|---|
| JP | 2013-112045 | 6/2013 |
| JP | 5789498 | 10/2015 |
| KR | 10-2014-0067705 | 6/2014 |
| KR | 10-2015-0071106 | 6/2015 |
| KR | 10-2016-0001394 | 1/2016 |
| KR | 2016-001394 | 1/2016 |
| KR | 20160001394 A * | 1/2016 |

OTHER PUBLICATIONS

Korean Office Action issued in Application 10-2016-0023400 dated Nov. 16, 2016.

* cited by examiner

ROBOT CLEANER AND WHEEL ASSEMBLY

CROSS-REFERENCE TO RELATED APPLICATION

This application claims priority under 35 U.S.C. § 119 to Korean Application No. 10-2016-0023400, filed on Feb. 26, 2016, whose entire disclosure is hereby incorporated by reference.

BACKGROUND

1. Field

The present disclosure relates to a robot cleaner and a wheel assembly.

2. Background

The robot cleaner includes a body defining an outer appearance. The body includes a plurality of wheels for movement of the body, a plurality of motors for rotating the plurality of wheels, respectively, and a control unit that controls the plurality of motors.

Further, the body may include an auxiliary wheel that helps the movement of the body, and a floor detection sensor that detects a state of a bottom surface.

The floor detection sensor may detect the state of the bottom surface. That is, the floor detection sensor may detect a lower area than a surface to be cleaned and a higher area (for example, a door sill or the like) than the surface to be cleaned.

When the floor detection sensor detects the lower area than the surface to be cleaned, the control unit controls the motors such that the body is moved rearward. On the other hand, when the floor detection sensor detects the higher area than the surface to be cleaned, the control unit controls the motors such that the body is continuously moved forward.

However, as an example, when a height of an obstacle such as the door sill, which is located at a particular height, is large, a problem that the wheels of the body cannot climb up the obstacle occurs. In this case, because the motors are continuously rotated in a state in which the wheels are caught by the obstacle, a problem that the wheels are damaged or the motors are overloaded occurs.

To solve the above problems, a robot cleaner including an auxiliary moving device having a movable member that lifts up a body is disclosed in Korean patent No. 10-1411742 (filed on Jun. 18, 2014) as the prior art document.

In case of the robot cleaner, as the body is lifted up by the auxiliary moving device, the robot cleaner may climb up an obstacle such as a door sill. However, because the auxiliary moving device should be additionally designed and applied, there is a problem in that a structure of the robot cleaner is complex and manufacturing costs thereof are increased.

Further, in case of the robot cleaner disclosed in the prior art document, the body is merely lifted up when the robot cleaner is moved forward. Thus, there is a problem in that it is difficult for the robot cleaner to climb up the obstacle such as the door sill when the body is moved rearward.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 1:
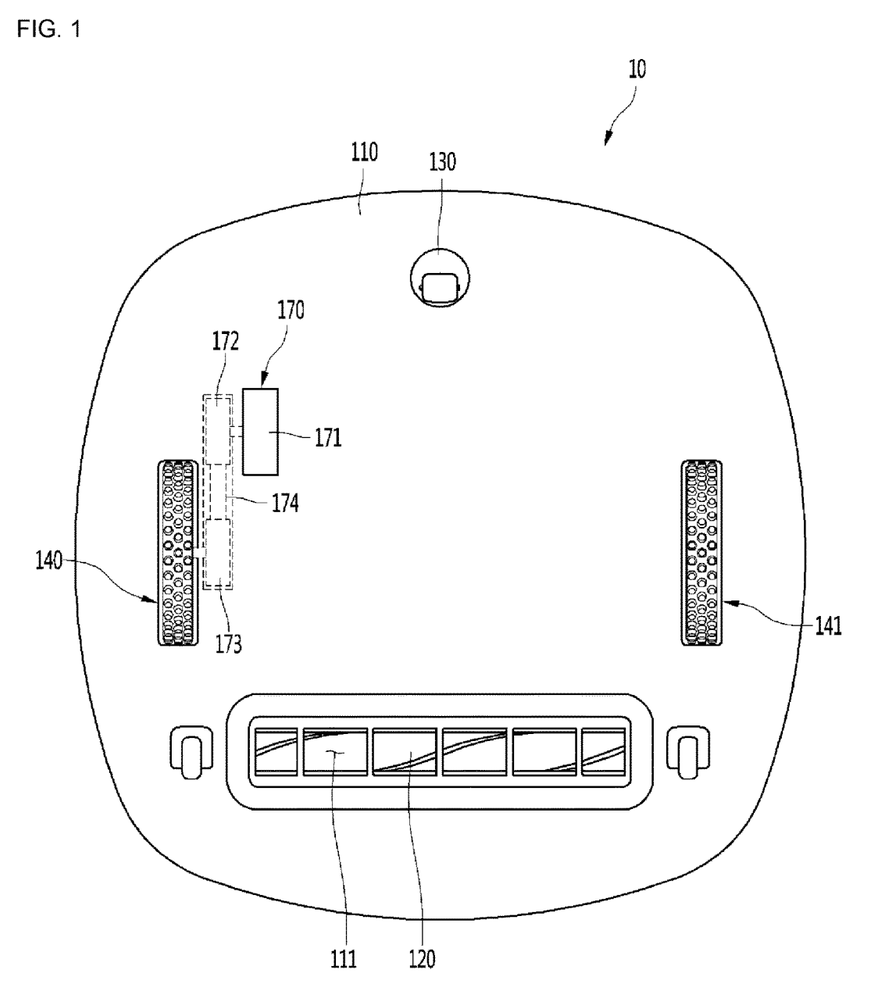
FIG. 1 is a bottom view illustrating a robot cleaner according to an embodiment of the present disclosure.
Figure 2:
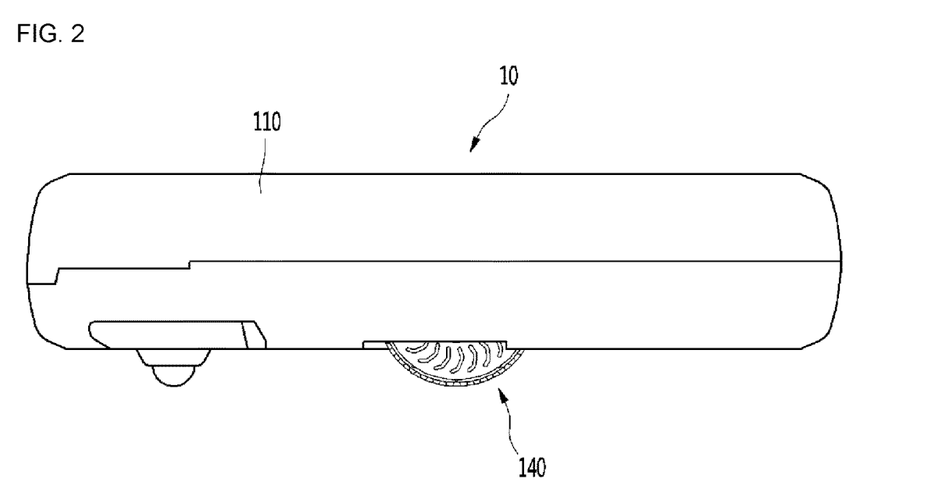
FIG. 2 is a side view illustrating the robot cleaner according to the embodiment of the present disclosure.

FIG. 1 is a bottom view illustrating a robot cleaner according to an embodiment of the present disclosure, and FIG. 2 is a side view illustrating the robot cleaner according to the embodiment of the present disclosure.

Referring to FIGS. 1 and 2, a robot cleaner 10 according to an embodiment of the present disclosure includes a body 110 that defines an outer appearance. Various components may be installed in the body 110.

For example, a suction motor (not illustrated) for sucking foreign substances and a dust collecting means (not illustrated) in which the sucked foreign substances are stored may be provided within the body 110.

Suction ports 111 may be provided in a bottom surface of the body 110. The suction ports 111 serve as an inlet through which foreign substances are sucked into the body 110, substantially, into the dust collecting means by the not-illustrated suction motor. The suction ports 111 are formed by cutting portions of the bottom surface of the body 110.

Brushes 120 may be installed at locations corresponding to the suction ports 111. The brushes 120 serve to remove foreign substances on a surface to be cleaned while passing through the suction ports 111 and being in contact with the foreign substances on the surface to be cleaned. The brushes 120 should be rotatably installed in the body 110 while being exposed downward through the suction ports 111.

The body 110 may include a wheel assembly for movement of the body 110. The wheel assembly may include a plurality of wheels 140 and 141. Further, the body 110 may further include a plurality of driving devices 170 for individually driving the plurality of wheels 140 and 141.

Further, the body 110 may further include an auxiliary wheel 130 such that a state in which the body 110 is stably positioned on a bottom surface is maintained.

Here, the plurality of wheels 140 and 141 may be spaced apart from the body 110 in a left-right direction such that the body 110 may be balanced in the left-right direction.

The plurality of wheels 140 and 141 may include a first wheel 140 and a second wheel 141.

The auxiliary wheel 130 may be located in front of the plurality of wheels 140 and 141 (at an upper portion of the body in FIG. 1) that facilitate a change of a direction when the body 110 is moved.

Each driving device 170 may include a driving motor 171 and a power transmission unit for transferring power of the driving motor 171 to the wheels 140 and 141. It is preferred that power of the motor is transferred by the power transmission unit because the power should be increased to ensure torque, although a shaft of the driving motor 171 may be directly connected to the wheels 140 and 141.

Although not restrictive, the power transmission unit may include a first pulley 172 connected to the driving motor 171, a second pulley 173 connected to the wheels 140 and 141 and a transmission belt 174 surrounded by the pulleys 172 and 173.

As another example, the power transmission unit may include a plurality of gears, and it is noted in the present disclosure that the power transmission unit may be implemented by a well-known structure.

Meanwhile, the wheels 140 and 141 may come into contact with an obstacle such as a door sill while the body 110 is moved. Here, the wheels 140 and 141 may be designed to have a shape-deformable structure such that the wheels 140 and 141 may easily climb up the door sill without using a separate structure while the body 110 is moved.

Hereinafter, structures of the wheels according to the present disclosure will be described in detail.

Figure 3:
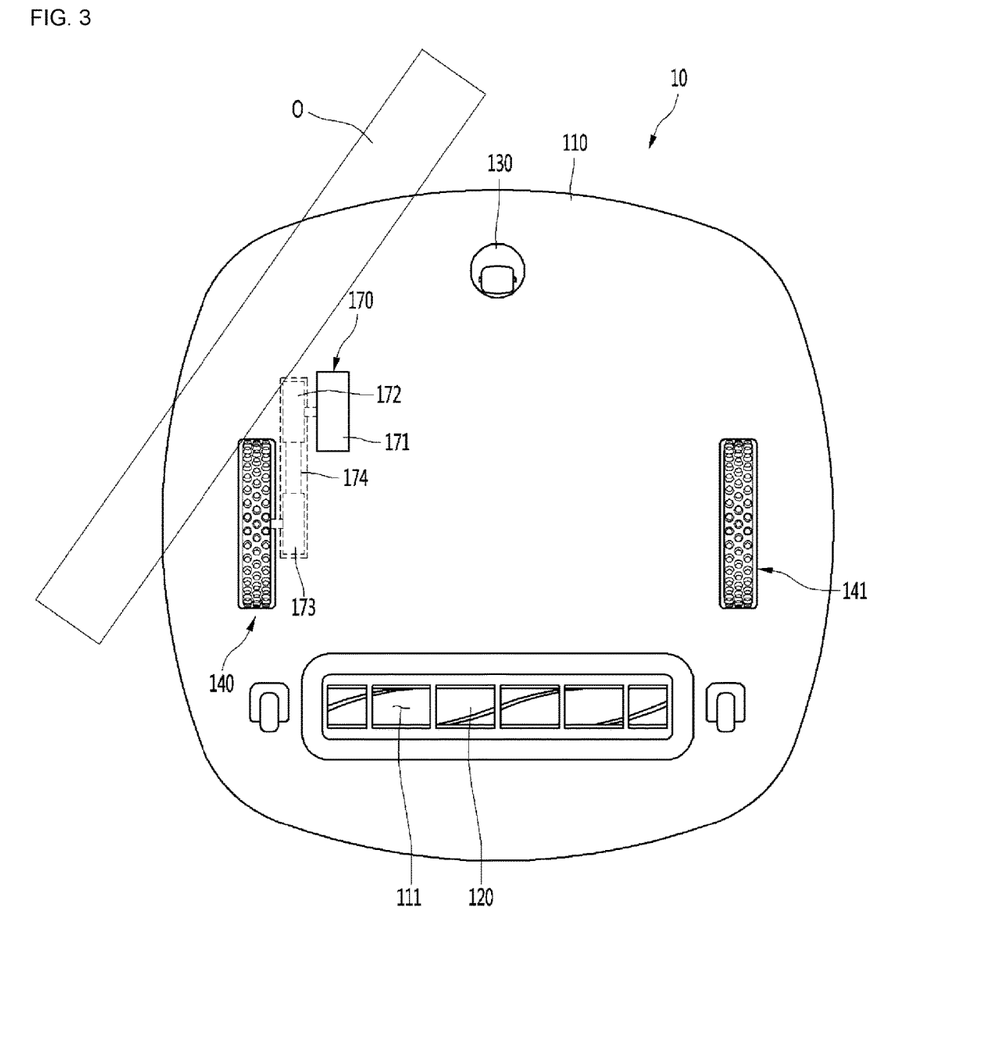
FIG. 3 is a view illustrating a state in which one wheel of the robot cleaner is in contact with an obstacle according to the embodiment of the present disclosure.
Figure 4:
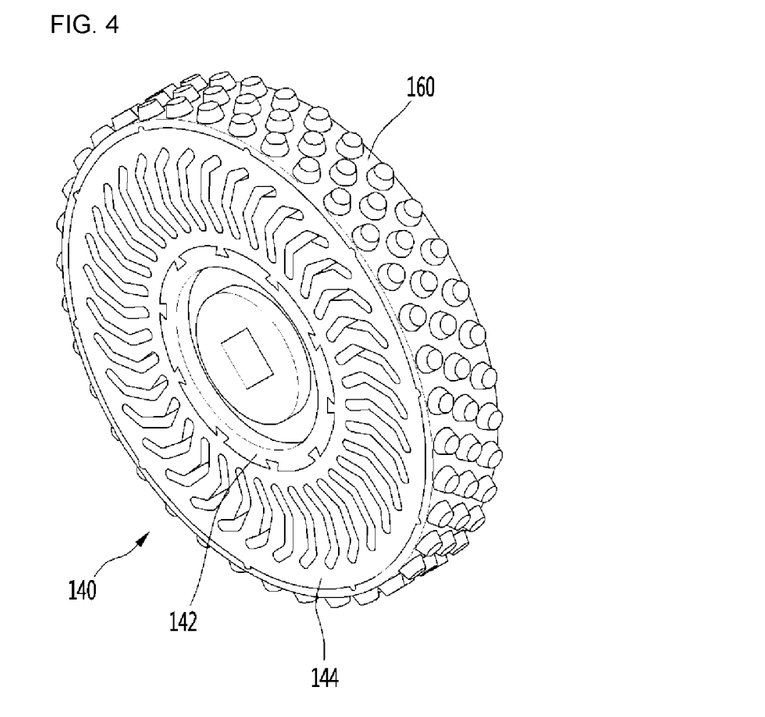
FIG. 4 is a perspective view illustrating a first wheel according to the embodiment of the present disclosure.
Figure 5:
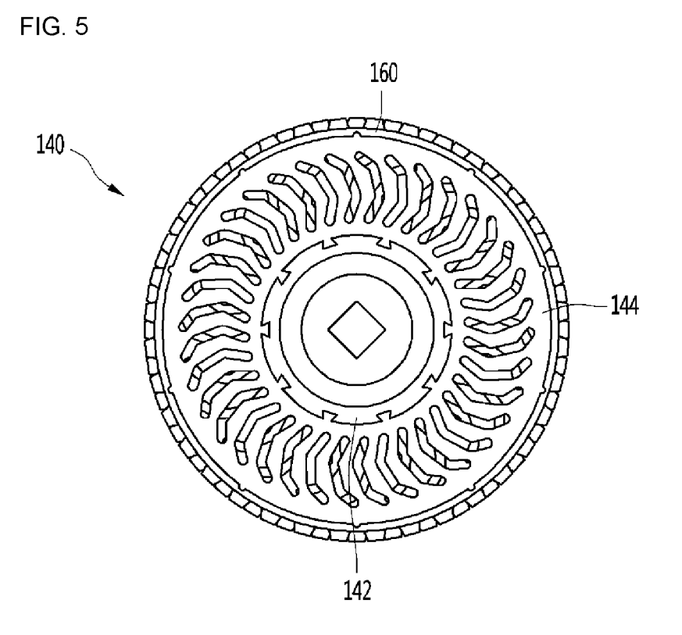
FIG. 5 is a side view illustrating the first wheel of FIG. 4.

FIG. 3 is a view illustrating a state in which one wheel of the robot cleaner is in contact with an obstacle according to the embodiment of the present disclosure, FIG. 4 is a perspective view illustrating the first wheel according to the embodiment of the present disclosure, and FIG. 5 is a side view illustrating the first wheel of FIG. 4.

Figure 6:
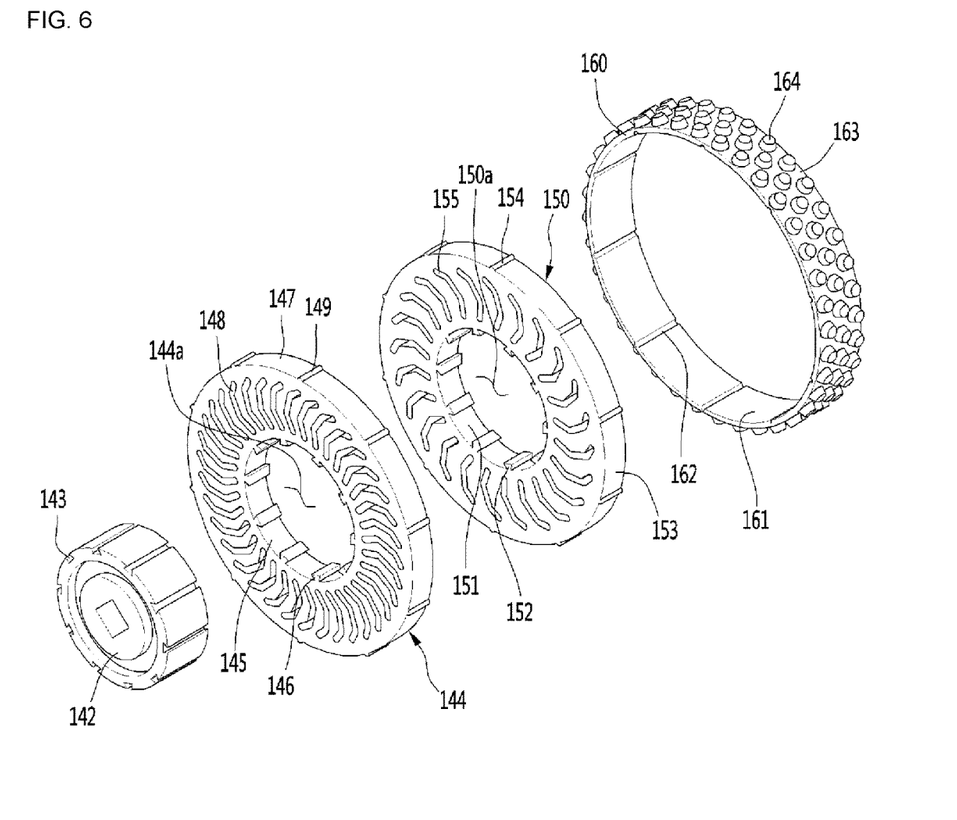
FIG. 6 is an exploded perspective view illustrating the first wheel of FIG. 4.
Figure 7:
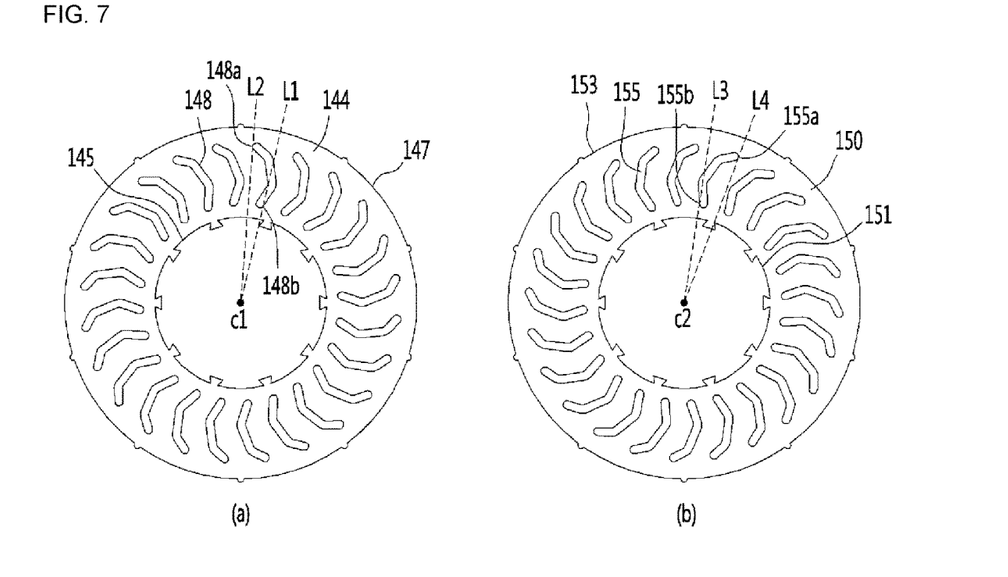
FIG. 7 is a view illustrating shapes of slits of an outer wheel and an inner wheel.

FIG. 6 is an exploded perspective view illustrating the first wheel of FIG. 4, and FIG. 7 is a view illustrating shapes of slits of an outer wheel and an inner wheel.

Figure 8:
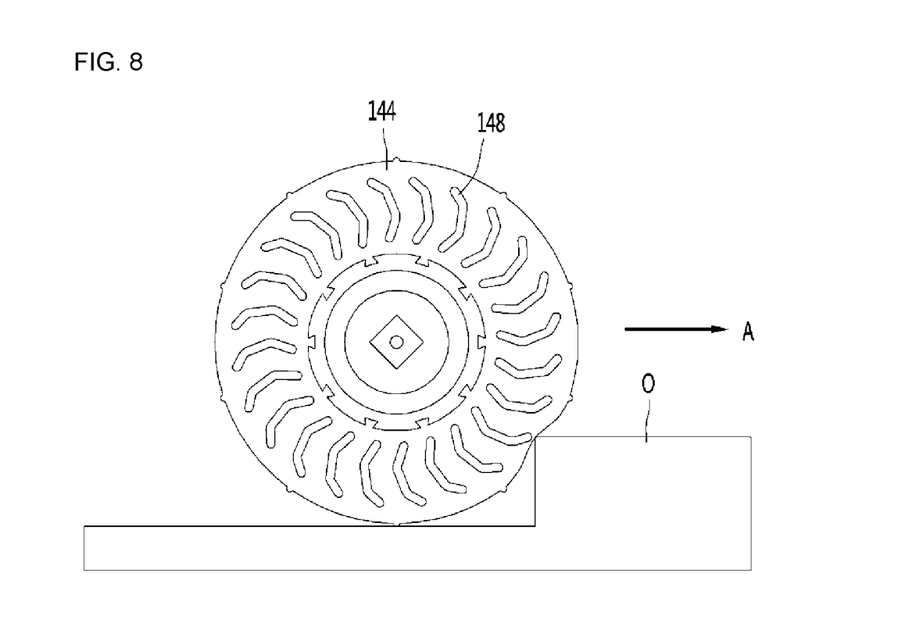
FIG. 8 is a view illustrating a state in which the first wheel is deformed when the robot cleaner is moved forward.
Figure 9:
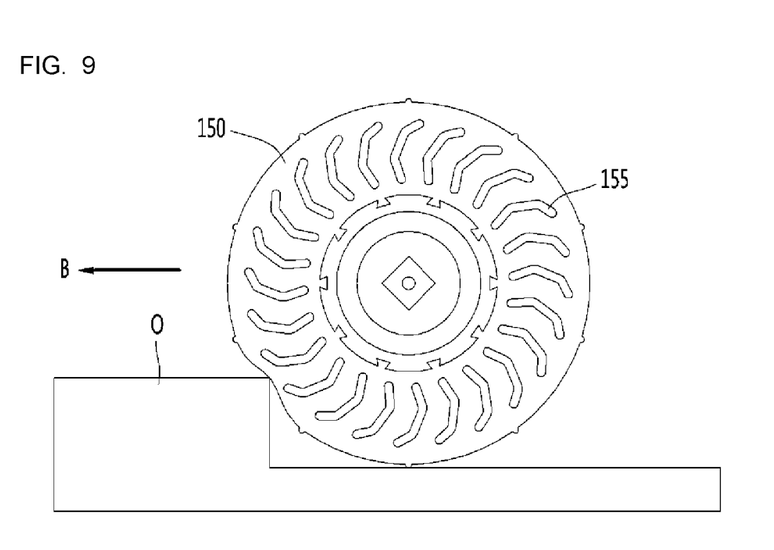
FIG. 9 is a view illustrating a state in which the first wheel is deformed when the robot cleaner is moved rearward.

FIG. 8 is a view illustrating a state in which the first wheel is deformed when the robot cleaner is moved forward, and FIG. 9 is a view illustrating a state in which the first wheel is deformed when the robot cleaner is moved rearward.

Hereinafter, the first wheel will be described. Further, because the second wheel has the same structure as that of the first wheel, a detailed description thereof will be omitted.

Referring to FIGS. 1 to 9, the first wheel 140 according to the embodiment of the present disclosure may include a wheel frame 142 through which the power of the driving motor 171 is received, an outer wheel 144 coupled to the wheel frame 142 to surround the wheel frame 142 and an inner wheel 150 coupled to the wheel frame 142 to surround the wheel frame 142.

In the present disclosure, the outer wheel 144, which is a wheel exposed to the outside when the first wheel 140 is viewed as in FIG. 2, is a wheel located outside the inner wheel 150.

The outer wheel 144 and the inner wheel 150 may be formed of a material that is shape-deformable by external force. As an example, the outer wheel 144 and the inner wheel 150 may be formed of rubber.

In the present disclosure, the reason why the first wheel 140 includes the outer wheel 144 and the inner wheel 150 is to allow the first wheel 140 to easily climb up the obstacle such as the door sill as the first wheel 140 is deformed by one wheel when the robot cleaner 10 is moved forward and to allow the first wheel 140 to easily climb up the first wheel 140 as the first wheel 140 is deformed by the other wheel when the robot cleaner 10 is moved rearward.

In detail, referring to FIG. 3, when the robot cleaner 10 is moved forward, generally, the obstacle such as the door sill firstly come into contact with an outer portion of the first wheel 140.

Thus, in the present disclosure, the first wheel 140 includes the outer wheel 144 and the inner wheel 150, and as the first wheel 140 is deformed by the outer wheel 144 while the robot cleaner 10 is moved forward, the first wheel 140 may easily climb up the door sill. On the other hand, as the first wheel 140 is deformed by the inner wheel 144 while the robot cleaner 10 is moved rearward, the first wheel 140 may easily climb up the door sill.

Further, in the present disclosure, the reason why the first wheel 140 may easily climb up the obstacle such as the door sill through deformation of the outer wheel 144 or the inner wheel 100 is that a contact area between the first wheel 140 and the obstacle is increased as the first wheel 140 is deformed as illustrated in FIGS. 8 and 9, and accordingly, friction force between the first wheel 140 and the obstacle is increased.

A plurality of first coupling grooves 143 to be coupled to the outer wheel 144 and the inner wheel 150 may be provided on an outer peripheral surface of the wheel frame 142.

Here, the plurality of first coupling grooves 143 may be arranged in parallel to an extending direction of a rotation center line of the wheel frame 142 such that the outer wheel 144 and the inner wheel 150 are easily coupled to the wheel frame 142. Thus, the plurality of first coupling grooves 143 are spaced apart from each other in a circumferential direction of the wheel frame 142.

In the present embodiment, the outer wheel 144 and the inner wheel 150 may be individually coupled to the wheel frame 142. Thus, the outer wheel 144 and the inner wheel 150 may be independently deformed along a direction in which the external force is applied, and accordingly, the robot cleaner 10 may easily climb up the obstacle when being moved forward or rearward.

Further, because the outer wheel 144 and the inner wheel 150 may be individually coupled to the wheel frame 142, the structure and the number of the power transmission unit for driving the outer wheel 144 and the inner wheel 150 may be minimized.

The outer wheel 144 may have a hole 144a formed at a center thereof such that the outer wheel 144 is coupled to the wheel frame 142. Thus, the outer wheel 144 may include an inner peripheral surface 145 and an outer peripheral surface 147. Further, a plurality of first coupling bosses 146 to be coupled to the wheel frame 142 may be provided on the inner peripheral surface 145 of the outer wheel 144.

To fit the plurality of first coupling bosses 146 in the plurality of first coupling grooves 143 of the wheel frame 142, the plurality of first coupling bosses 146 may be arranged on the inner peripheral surface 145 of the outer wheel 144 to be spaced apart from each other in a circumferential direction of the inner peripheral surface 145.

The inner wheel 150 may have a hole 150a formed at a center thereof such that the inner wheel 150 is coupled to the wheel frame 142. Thus, the inner wheel 150 may include an inner peripheral surface 151 and an outer peripheral surface 153. Further, a plurality of second coupling bosses 152 to be coupled to the wheel frame 142 may be provided on the inner peripheral surface 151 of the inner wheel 150.

To fit the plurality of second coupling bosses 152 in the plurality of first coupling grooves 143 of the wheel frame 142, the plurality of second coupling bosses 152 may be arranged on the inner peripheral surface 151 of the inner wheel 150 to be spaced apart from each other in a circumferential direction of the inner peripheral surface 151.

In contrast, it is probable that coupling bosses are formed in the wheel frame 142 and coupling grooves into which the coupling bosses are inserted are formed on each of the outer wheel 144 and the inner wheel 150.

A plurality of first slits 148 for facilitating deformation of the outer wheel 144 are formed in the outer wheel 144 and a plurality of second slits 155 for facilitating deformation of the inner wheel 150 are provided in the inner wheel 150.

Here, as described above, to make a deformation amount of the outer wheel 144 large when the robot cleaner 10 is moved forward and make a deformation amount of the inner wheel 150 large when the robot cleaner 10 is moved rearward, the shape and the arrangement direction of the plurality of first slits 148 may be opposite to the shape and the arrangement direction of the plurality of second slits 155.

In detail, referring to FIG. 7(a), at least some of the first slits 148 may extend to be inclined with respect to a virtual reference line connecting a rotation center C1 of the outer wheel 144 and the outer peripheral surface 147. This is for easily deforming the outer wheel 144 by a portion of the first slits 148, which is inclined with respect to the reference line, when external force is applied in a direction in which the reference line extends while the first wheel 140 is rotated.

Further, each first slit 148 may have a length that is larger than a width, to increase the deformation amount of the outer wheel 144 by the first slit 148. As an example, the first slit 148 may include a first end 148a and a second end 148b, and the first end 148a may be closer to the outer peripheral surface 147 of the outer wheel 144 than the second end 148b. As an example, the first slit 148 may be entirely rounded or a portion of the first slit 148, which connects both ends of the first slit 148, may be bent one or more times.

Thus, due to the shape of the first slit 148, a first virtual line L1 connecting the rotation center C1 of the outer wheel 144 and the second end 148b of the first slit 148, which is closest to the inner peripheral surface 145, and a second virtual line L2 connecting the rotation center C1 and the first end 148a of the first slit 148, which is closest to the outer peripheral surface 147, may exist.

Then, the first virtual line L1 and the second virtual line L2 are arranged to have a constant angle, and when the outer wheel 144 is rotated in a first direction (for example, in a clockwise direction in FIG. 7) to move the robot cleaner 10 forward, the first virtual line L1 is rotated before the second virtual line L2.

Further, when a middle line refers to a line connecting one point between the first end 148a and the second end 148b and the rotation center C1 of the outer wheel 144, an angle between the second virtual line L2 and the middle line is larger than an angle between the first virtual line L1 and the second virtual line L2.

A connection line of a straight line connecting the first end 148a and the second end 148b is located outside the first slit 148.

Meanwhile, referring to FIG. 7(b), at least some of the second slits 155 may extend to be inclined with respect to a virtual reference line connecting a rotation center C2 of the inner wheel 150 and the outer peripheral surface 153. This is for easily deforming the inner wheel 150 by a portion of the second slits 155, which is inclined with respect to the reference line, when external force is applied in a direction in which the reference line extends while the first wheel 140 is rotated.

Further, each second slit 155 may have a length that is larger than a width, to increase the deformation amount of the inner wheel 150 by the second slit 155. As an example, the second slit 155 may include a first end 155a and a second end 155b, and the first end 155a may be closer to the outer peripheral surface 153 of the inner wheel 150 than the second end 155b. As an example, the second slit 155 may be entirely rounded or a portion of the second slit 155, which connects both ends of the second slit 155, may be bent one or more times.

Thus, due to the shape of the second slit 155, a third virtual line L3 connecting the rotation center C2 of the inner wheel 150 and the second end 155b of the second slit 155, which is closest to the inner peripheral surface 151, and a fourth virtual line L4 connecting the rotation center C2 and the first end 155a of the second slit 155, which is closest to the outer peripheral surface 153, may exist.

Then, the third virtual line L3 and the fourth virtual line L4 are arranged to have a constant angle, and when the inner wheel 150 is rotated in a second direction that is opposite to the second direction (for example, in a counterclockwise direction in FIG. 7) to move the robot cleaner 10 rearward, the third virtual line L3 is rotated before the fourth virtual line L4.

Further, when a middle line refers to a line connecting one point between the first end 155a and the second end 155b and the rotation center C2 of the inner wheel 150, an angle between the fourth virtual line L4 and the middle line is larger than an angle between the third virtual line L3 and the fourth virtual line L4.

A connection line of a straight line connecting the first end 155a and the second end 155b is located outside the second slit 155.

Thus, as illustrated in FIG. 8, when the robot cleaner 10 is moved forward (when the robot cleaner 10 is moved in a direction of arrow A), the first wheel 140 may be deformed by the outer wheel 144 so that the robot cleaner 10 may easily climb up an obstacle O. Further, as illustrated in FIG. 9, when the robot cleaner 10 is moved rearward (when the robot cleaner 10 is moved in a direction of arrow B), the first wheel 140 may be deformed by the inner wheel 150 so that the robot cleaner 10 may easily climb up the obstacle O.

Meanwhile, as the outer wheel 144 and the inner wheel 150 are coupled to the wheel frame 142, a gap between the outer wheel 144 and the inner wheel 150 may be generated. To prevent foreign substances from being introduced into between the gap, the first wheel 140 may further include a cover 160 for covering the gap between the outer wheel 144 and the inner wheel 150.

The cover 160 may be coupled to the outer wheel 144 and the inner wheel 150 to cover circumferences of the outer wheel 144 and the inner wheel 150 so as to cover the gap.

To make rotation of the first wheel 140 smooth, a width of the cover 160 may be equal to a sum of a width of the outer wheel 144 and a width of the inner wheel 150. That is, the cover 160 may entirely cover the outer wheel 144 and the inner wheel 150.

The cover 160 may be formed of rubber to increase friction force between the cover 160 and the bottom surface.

The cover 160 may be formed to have a ring shape so as to cover the outer wheel 144 and the inner wheel 150. Thus, the cover 160 may include an inner peripheral surface 161 and an outer peripheral surface 163.

Further, a plurality of second coupling grooves 162 to be coupled to the outer wheel 144 and the inner wheel 150 may be provided on an inner peripheral surface 161. Here, the plurality of second coupling grooves 162 may be arranged in parallel to the extending direction of the rotation center of the wheel frame 142 such that the outer wheel 144 and the inner wheel 150 may be easily coupled to the cover 160. Thus, the plurality of second coupling grooves 162 are spaced apart from each other in a circumferential direction of the cover 160.

Further, a plurality of first cover coupling bosses 149 to be coupled to the cover 160 are provided on the outer peripheral surface 147 of the outer wheel 144, and a plurality of second cover coupling bosses 154 to be coupled to the cover 160 may be formed on the outer peripheral surface 153 of the inner wheel 150. Further, the plurality of first cover coupling bosses 149 and the plurality of second cover coupling bosses 154 may be arranged in parallel to the extending direction of the rotation center of the wheel frame 142 such that the outer wheel 144 and the inner wheel 150 may be easily coupled to the cover 160.

Further, the first cover coupling bosses 149 and the second cover coupling bosses 154 may be inserted into the second coupling grooves 162 together.

In contrast, coupling bosses may be formed on an outer peripheral surface of the wheel frame 160 and coupling grooves into which the coupling bosses are inserted may be formed on an outer peripheral surface of each of the inner wheel 150 and the outer wheel 144.

A plurality of contact protrusions 164 arranged in a circumferential direction of the cover 160 may be provided on the outer peripheral surface 163 of the cover 160. The plurality of contact protrusions 164 may allow the first wheel 140 to be rotated on a bottom surface such as a carpet as well as a smooth bottom surface. Further, the plurality of contact protrusions 164 serve to increase a friction area between the first wheel 140 and the obstacle such as the door sill when the first wheel 140 comes into contact with the obstacle, so that the first wheel 140 may easily climb up the obstacle.

Figure 10:
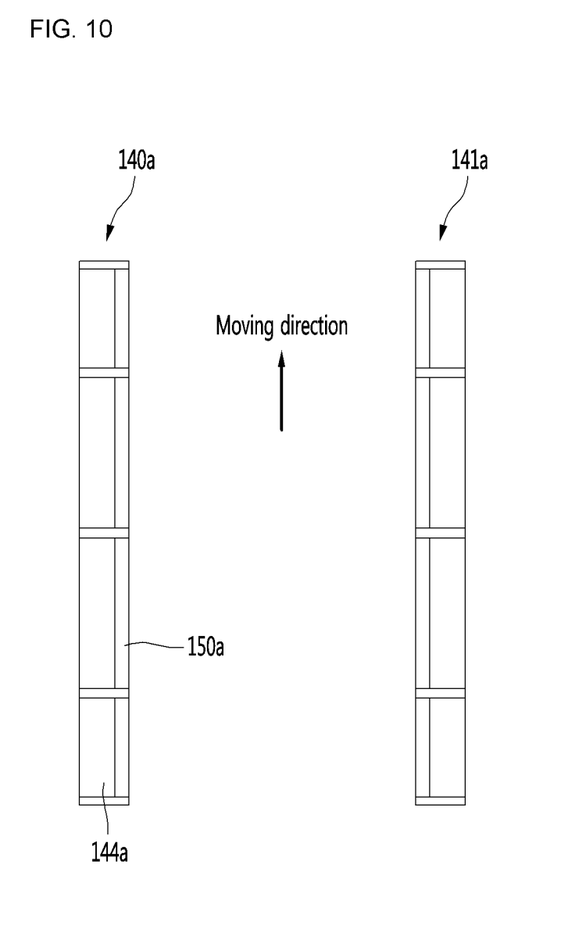
FIG. 10 is a view illustrating structures of wheels according to another embodiment of the present disclosure.

FIG. 10 is a view illustrating structures of wheels according to another embodiment of the present disclosure.

However, other elements in the present embodiment are identical to those according to the prior embodiment, and only thicknesses of an inner wheel and an outer wheel according to the present embodiment are different from those according to the prior embodiment. Thus, only characteristic parts according to the present embodiment will be described below.

Referring to FIGS. 3 and 10, a robot cleaner according to the present embodiment may include a first wheel 140a and a second wheel 141.

Each of the wheels 140a and 141a may include an outer wheel 144a and an inner wheel 150a.

As illustrated in FIG. 3, when the robot cleaner is moved forward, the obstacle such as the door sill may firstly come into contact with the outer wheel 144a. Thus, when the robot cleaner is moved forward, only if a deformation amount of the outer wheel 144a becomes larger, the robot cleaner may easily climb up the door sill.

Thus, in the present embodiment, a thickness of the outer wheel 144 may be larger than a thickness of the inner wheel 150 such that deformation amounts of the wheels 140a and 141a are maximized if the wheels 140a and 141a come into contact with the obstacle while the robot cleaner is moved forward.

Further, when the thickness of the outer wheel 144 is larger than the thickness of the inner wheel 150, the robot cleaner may easily climb up the obstacle because the deformation amount of the outer wheel 144 may be enlarged regardless of a contact angle between the robot cleaner and the obstacle.

The present disclosure provides a robot cleaner and a wheel assembly in which wheels are deformed during moving so that the wheels may easily climb up an obstacle such as a door sill.

Further, the present disclosure provides a robot cleaner and a wheel assembly which may easily climb up an obstacle such as a door sill even while moving rearward as well as moving forward.

Further, the present disclosure provides a robot cleaner and a wheel assembly in which foreign substances are prevented from being introduced into a space between an inner wheel and an outer wheel.

A robot cleaner may include: a body having a suction port; a plurality of wheels for movement of the body; and a plurality of driving devices configured to drive the plurality of wheels, respectively, wherein each of the plurality of wheels includes: a wheel frame through which a driving force of the corresponding driving device is received; an outer wheel coupled to the wheel frame; an inner wheel coupled to the wheel frame; and a cover configured to cover circumferences of the outer wheel and the inner wheel.

Rotation centers of the outer wheel and the inner wheel may be identical to each other, and a thickness of the outer wheel may be larger than a thickness of the inner wheel.

The outer wheel may include a plurality of first slits such that the outer wheel may be deformed by external force, the inner wheel may include a plurality of second slits such that the inner wheel may be deformed by the external force, and arrangement and shapes of the plurality of first slits may be different from arrangement and shapes of the plurality of second slits.

A wheel assembly may include: a wheel frame through which a driving force of a driving device is received; an outer wheel coupled to an outer peripheral surface of the wheel frame; an inner wheel coupled to the outer peripheral surface of the wheel frame; and a cover configured to cover circumferences of the outer wheel and the inner wheel together, wherein a thickness of the outer wheel is larger than a thickness of the inner wheel, the outer wheel includes a plurality of first slits such that the outer wheel is deformed by external force, and the inner wheel includes a plurality of second slits such that the inner wheel is deformed by the external force.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
a body having a suction port;
a plurality of wheels at the body; and
at least one driving device configured to provide a driving force for driving at least one of the plurality of wheels,
wherein each of the plurality of wheels includes:
a wheel frame to receive the driving force of the at least one driving device;
an outer wheel to couple to the wheel frame;
an inner wheel to couple to the wheel frame; and
a cover to cover a circumference of the outer wheel and a circumference of the inner wheel,
wherein a rotation center of the outer wheel is aligned with a rotation center of the inner wheel,
wherein a thickness of the outer wheel in an extension direction of the rotation center of the outer wheel is greater than a thickness of the inner wheel in an extension direction of the rotation center of the inner wheel,
wherein the outer wheel includes a plurality of first slits such that the outer wheel is to be deformed by external force,
wherein the inner wheel includes a plurality of second slits such that the inner wheel is to be deformed by external force, and
wherein an arrangement the plurality of first slits is different from an arrangement of the plurality of second slits, and a shape of at least one of the plurality of first slits is different from at least one of the plurality of second slits.

2. The robot cleaner of claim 1, wherein the arrangement and the shape of the plurality of first slits and the arrangement and the shape of the plurality of second slits are opposite to each other with respect to the rotation centers of the inner and outer wheels.

3. The robot cleaner of claim 1, wherein each of the plurality of first slits of the outer wheel has a length that is larger than a width, and each of the plurality of second slits of the inner wheel has a length that is larger than a width.

4. The robot cleaner of claim 1, wherein each of the plurality of first slits and each of the plurality of second slits has a first end and a second end, and
wherein the first end of each of the first slits is closer to an outer peripheral surface of the outer wheel than the second end of the same corresponding one of the first slits, and
wherein the first end of each of the second slits is closer to an outer peripheral surface of the inner wheel than the second end of the same corresponding one of the second slits.

5. The robot cleaner of claim 4, wherein a first virtual line connecting the rotation center of the outer wheel and the first end of the first slit of the outer wheel and a second virtual line connecting the rotation center of the outer wheel and the second end of the first slit of the outer wheel are arranged to have a constant angle,
wherein a third virtual line connecting the rotation center of the inner wheel and the first end of the second slit of the inner wheel and a fourth virtual line connecting the rotation center of the inner wheel and the second end of the second slit of the inner wheel are arranged to have a constant angle,
wherein when the outer wheel is rotated in a specific direction to move the body in a first direction, the first virtual line is rotated before the second virtual line, and
wherein when the inner wheel is rotated in a specific direction to move the body in a second direction, the third virtual line is rotated before the fourth virtual line.

6. The robot cleaner of claim 5, wherein a middle line corresponds to a virtual line connecting one point between the first end and the second end of the first slit and the rotation center of the outer wheel, and an angle between the second virtual line and the middle line is larger than an angle between the first virtual line and the second virtual line.

7. The robot cleaner of claim 5, wherein a connection line of a straight line connecting the first end and the second end is provided outside each slit.

8. The robot cleaner of claim 1, wherein each of the plurality of first slits of the outer wheel is rounded or is bent one or more times, and each of the plurality of second slits of the inner wheel is rounded or is bent one or more times.

9. The robot cleaner of claim 1, wherein the outer wheel and the inner wheel are coupled to the wheel frame in a direction that is parallel to an extending direction of a rotation center line of the wheel frame.

10. The robot cleaner of claim 1, wherein the wheel frame includes one of fastening bosses or fastening grooves on an outer peripheral surface of the wheel frame, and
wherein the other one of the fastening bosses or the fastening grooves are provided on an inner peripheral surface of the outer wheel and on an inner peripheral surface of the inner wheel.

11. The robot cleaner of claim 1, wherein one of fastening bosses or fastening grooves are provided on an outer peripheral surface of each of the outer wheel and the inner wheel, and
wherein the other one of the fastening bosses or the fastening grooves are provided on an inner peripheral surface of the cover.

12. The robot cleaner of claim 1, wherein the cover includes a plurality of contact protrusions on an outer peripheral surface of the cover.

13. A wheel assembly comprising:
a wheel frame to receive a driving force;
an outer wheel to couple to an outer peripheral surface of the wheel frame;
an inner wheel to couple to the outer peripheral surface of the wheel frame; and
a cover to cover a circumference of the outer wheel and a circumference of the inner wheel,
wherein a thickness of the outer wheel in an extension direction of a rotation center of the outer wheel is larger than a thickness of the inner wheel in an extension direction of a rotation center of the inner wheel, wherein the outer wheel includes a plurality of first slits such that the outer wheel is deformed by external force, and wherein the inner wheel includes a plurality of second slits such that the inner wheel is deformed by external force.

14. The wheel assembly of claim 13, wherein an arrangement of the plurality of first slits is different from an arrangement of the plurality of second slits, and a shape of at least one of the first slits is different from a shape of at least one of the second slits.

15. The wheel assembly of claim 13, wherein each of the plurality of first slits of the outer wheel has a length that is larger than a width, and each of the plurality of second slits of the inner wheel has a length that is larger than a width.

16. A robot cleaner comprising:
a body having a suction port;
a wheel assembly provided at the body; and
at least one driving device to provide a driving force to the wheel assembly,
wherein the wheel assembly includes:
  a wheel frame to receive a driving force;
  an outer wheel to couple to an outer peripheral surface of the wheel frame;
  an inner wheel to couple to the outer peripheral surface of the wheel frame; and
  a cover to cover a circumference of the outer wheel and a circumference of the inner wheel,
  wherein a thickness of the outer wheel in an extension direction of a rotation center of the outer wheel is larger than a thickness of the inner wheel in an extension direction of a rotation center of the inner wheel,
  wherein the outer wheel includes a plurality of first slits such that the outer wheel is deformed by external force, and
  wherein the inner wheel includes a plurality of second slits such that the inner wheel is deformed by external force.

17. A robot cleaner comprising:
a body having a suction port;
a wheel assembly having a plurality of wheels at the body; and
at least one driving device at the body to provide a driving force to at least one of the plurality of wheels,
wherein the at least one of the plurality of wheels includes:
  a wheel frame to receive the driving force of the at least one driving device;
  a first wheel to couple to the wheel frame; and
  a second wheel to couple to the wheel frame,
  wherein a rotational point of the first wheel is aligned with a rotational point of the second wheel,
  wherein a thickness of the first wheel in an extension direction of a rotation center of the first wheel is larger than a thickness of the second wheel in an extension direction of a rotation center of the second wheel,
  wherein the first wheel includes a plurality of first slits,
  wherein the second wheel includes a plurality of second slits, and
  wherein an arrangement of the plurality of first slits is different from an arrangement the plurality of second slits, and a shape of one of the first slits is different from a shape of one of the second slits.

18. The robot cleaner of claim 17, wherein each of the plurality of first slits of the first wheel has a length that is larger than a width, and each of the plurality of second slits of the second wheel has a length that is larger than a width.

19. The robot cleaner of claim 17, further comprising a cover to cover a portion of the first wheel and a portion of the second wheel.

20. The robot cleaner of claim 19, wherein one of fastening bosses or fastening grooves are provided on an outer surface of each of the first wheel and the second wheel, and
wherein the other one of the fastening bosses or the fastening grooves are provided on an inner surface of the cover.

21. The robot cleaner of claim 17, wherein the wheel frame includes one of fastening bosses or fastening grooves on an outer surface of the wheel frame, and
wherein the other one of the fastening bosses or the fastening grooves are provided on an inner surface of the first wheel and on an inner surface of the second wheel.

* * * * *